US012354285B2

(12) United States Patent
Miyake et al.

(10) Patent No.: US 12,354,285 B2
(45) Date of Patent: Jul. 8, 2025

(54) FALL PREVENTION SYSTEM

(71) Applicant: Yazaki Corporation, Tokyo (JP)

(72) Inventors: Hideto Miyake, Shizuoka (JP); Koji Ishii, Shizuoka (JP); Daiki Saito, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 452 days.

(21) Appl. No.: 17/902,429

(22) Filed: Sep. 2, 2022

(65) Prior Publication Data

US 2022/0414898 A1  Dec. 29, 2022

Related U.S. Application Data

(63) Continuation of application No. PCT/JP2021/006974, filed on Feb. 25, 2021.

(30) Foreign Application Priority Data

Mar. 24, 2020  (JP) .................. 2020-052176

(51) Int. Cl.
*G06T 7/246* (2017.01)
*G06V 10/26* (2022.01)
(Continued)

(52) U.S. Cl.
CPC .............. *G06T 7/251* (2017.01); *G06V 10/26* (2022.01); *G06V 20/59* (2022.01); *G06V 40/23* (2022.01);
(Continued)

(58) Field of Classification Search
CPC .......... G06T 7/251; G06T 2207/30196; G06V 10/26; G06V 20/59; G06V 40/23;
(Continued)

(56) References Cited

U.S. PATENT DOCUMENTS 10,949,656 B2 * 3/2021 Aoki ................ B60W 30/0956
2019/0205630 A1 * 7/2019 Kusens ................ A61B 5/6891
(Continued)

FOREIGN PATENT DOCUMENTS

JP          6217635 B2    10/2017
JP       2020-003936 A     1/2020
JP       2020-034960 A     3/2020

OTHER PUBLICATIONS

Yifeng Xu et al. "Human Posture Recognition and fall detection Using Kinect V2 Camera" Proceedings of the 38th Chinese Control Conference Jul. 27-30, 2019 Guangzhou, China, pp. 8488-8493 (6 pages).

(Continued)

*Primary Examiner* — Oneal R Mistry
*Assistant Examiner* — Jongbong Nah
(74) *Attorney, Agent, or Firm* — Sughrue Mion, PLLC

(57) ABSTRACT

A fall prevention system includes an image capturing unit that captures an image of a space to be monitored; a skeleton model generating unit that generates a skeleton model representing a person in the image captured by the image capturing unit; a determination unit that determines a state of a person corresponding to the skeleton model generated by the skeleton model generating unit, by distinguishing between the person standing up and the person sitting down, based on the skeleton model; and an operation processing unit capable of executing a fall prevention process that is a process according to a determination result by the determination unit, and that prevents the person from falling over, based on the determination result.

20 Claims, 5 Drawing Sheets

(51) Int. Cl.
  *G06V 20/59* (2022.01)
  *G06V 40/20* (2022.01)
  *G08B 21/04* (2006.01)

(52) U.S. Cl.
  CPC .. *G08B 21/043* (2013.01); *G06T 2207/30196* (2013.01)

(58) Field of Classification Search
  CPC .. G06V 10/764; G06V 40/103; G08B 21/043; G08B 21/0476; H04N 7/18
  See application file for complete search history.

(56) References Cited

U.S. PATENT DOCUMENTS

| | | | |
|---|---|---|---|
| 2021/0019507 A1* | 1/2021 | Brookshire | G06V 10/764 |
| 2021/0107421 A1* | 4/2021 | Uno | B60W 40/08 |
| 2021/0267491 A1* | 9/2021 | Guibene | A61B 5/1128 |

OTHER PUBLICATIONS

Anonymous, "Kinect", Wikipedia, XP090353400, Jun. 12, 2023, https://en.wikipedia.org/wiki/Kinect (40 pages).

* cited by examiner

FALL PREVENTION SYSTEM

CROSS-REFERENCE TO RELATED APPLICATION

This application is a continuation application of International Application No. PCT/JP2021/006974 filed on Feb. 25, 2021 which claims the benefit of priority from Japanese Patent Application No. 2020-052176 filed on Mar. 24, 2020 and designating the U.S., the entire contents of which are incorporated herein by reference.

BACKGROUND OF THE INVENTION

1. Field of the Invention

The present invention relates to a fall prevention system.

2. Description of the Related Art

For example, as a conventional technology related to a fall prevention system, Japanese Patent No. 6217635 discloses a fall detection device that extracts an appearance feature amount based on a human body image representing a human body to be detected, and that detects a fall of the human body based on the appearance feature amount.

Incidentally, for example, there is room for further improvement in the fall detection device disclosed in Japanese Patent No. 621763 described above, in terms of preventing a fall in a more appropriate manner.

SUMMARY OF THE INVENTION

The present invention has been made in view of the above circumstances, and an object of the present invention is to provide a fall prevention system capable of preventing a fall in an appropriate manner.

In order to achieve the above mentioned object, a fall prevention system according to one aspect of the present invention includes an image capturing unit that captures an image of a space to be monitored; a skeleton model generating unit that generates a skeleton model representing a person in the image captured by the image capturing unit; a determination unit that determines a state of the person corresponding to the skeleton model generated by the skeleton model generating unit, by distinguishing between the person standing up and the person sitting down, based on the skeleton model; and an operation processing unit capable of executing a fall prevention process that is a process according to a determination result by the determination unit, and that prevents the person from falling over, based on the determination result, wherein the skeleton model generating unit encloses the outside of an area where the person recognized in the image is present, with a bounding box and generates the skeleton model of the person in the bounding box by combining skeleton parts of a human body of the person, and the determination unit determines the state of the person corresponding to the skeleton model, by distinguishing between the person standing up and the person sitting down, on the basis of a relative positional relation of the skeleton parts in the skeleton model generated by a skeleton model generating unit, a relative distance, and a size of the bounding box.

According to another aspect of the present invention, in the fall prevention system, it is possible to further include that a guiding unit that performs guidance, wherein when the determination unit determines that the person corresponding to the skeleton model is standing up, the operation processing unit executes a guidance process of controlling the guiding unit to guide the person to sit down, as the fall prevention process.

According to still another aspect of the present invention, in the fall prevention system, it is possible to further include that a notification unit that sends notification, wherein when the determination unit determines that the person corresponding to the skeleton model is standing up, the operation processing unit executes a first notification process of controlling the notification unit to notify another person different from the person that the person is standing up, as the fall prevention process.

According to still another aspect of the present invention, in the fall prevention system, it is possible to further include that an external communication unit capable of communicating with an external device outside the space to be monitored, wherein when the determination unit determines that the person corresponding to the skeleton model is standing for a predetermined continuous period of time after the guidance process is executed, the operation processing unit executes a first reporting process of controlling the external communication unit to report the external device that the person is standing up, as the fall prevention process.

According to still another aspect of the present invention, in the fall prevention system, it is possible to configure that an internal communication unit capable of communicating with an in-vehicle device installed in a vehicle in which a vehicle interior space is the space to be monitored, wherein when the determination unit determines that the person corresponding to the skeleton model is standing up, the operation processing unit executes a start prohibition process of controlling the in-vehicle device via the internal communication unit to prohibit the vehicle from starting, as the fall prevention process.

According to still another aspect of the present invention, in the fall prevention system, it is possible to further include that a notification unit that performs a notification operation, and an external communication unit capable of communicating with an external device outside the space to be monitored, wherein the determination unit determines the state of the person corresponding to the skeleton model, by also distinguishing the person fallen over, in addition to the person standing up and the person sitting down, based on the skeleton model generated by the model generating unit, and when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the accompanying drawings. It is noted that the invention is not limited to the embodiment. Moreover, components in the following embodiment include those that can be easily replaced by those skilled in the art, or those substantially the same.

EMBODIMENT

Figure 1:
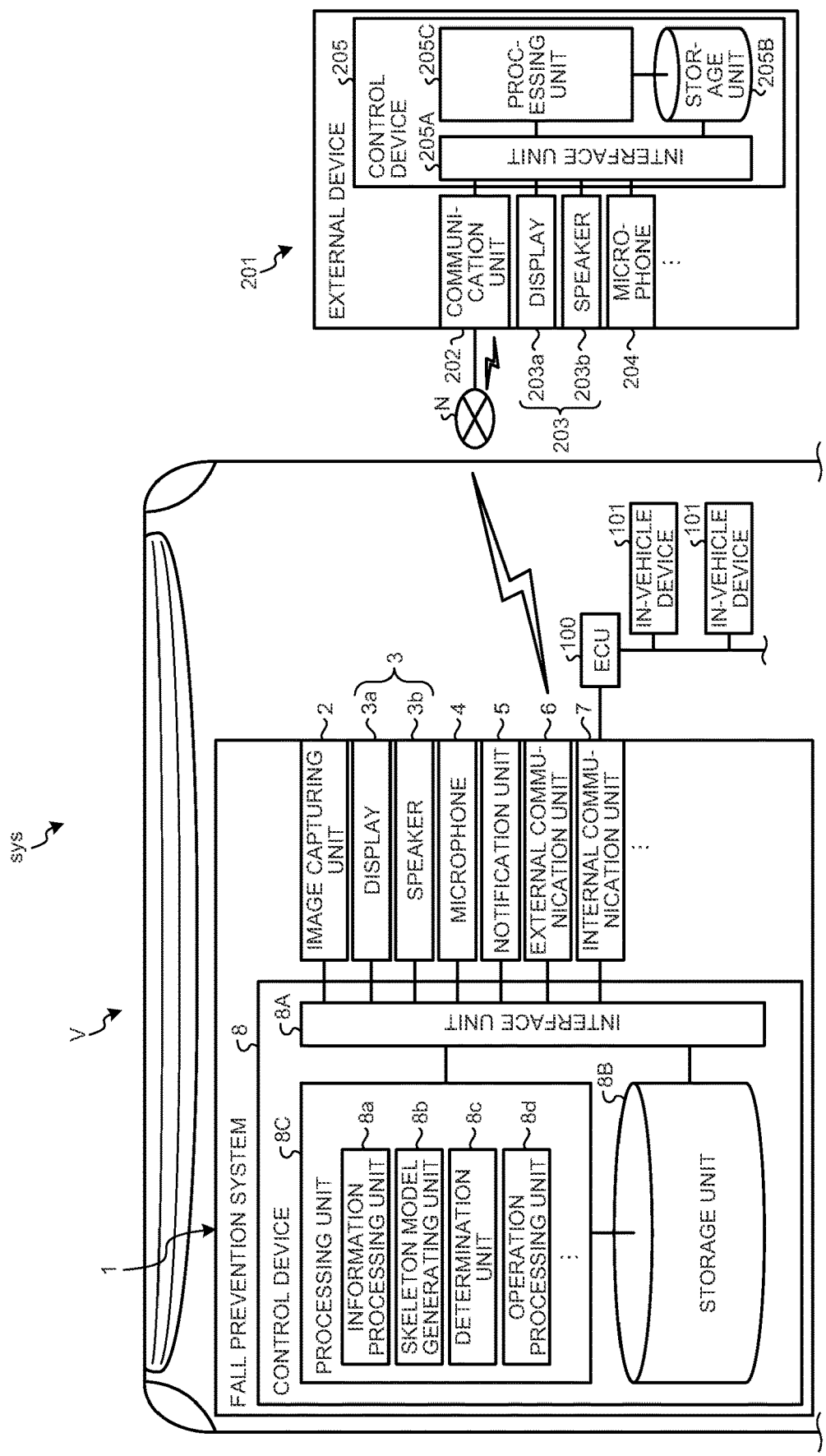
FIG. 1 is a block diagram illustrating a schematic configuration of a fall prevention system according to an embodiment.
Figure 2:
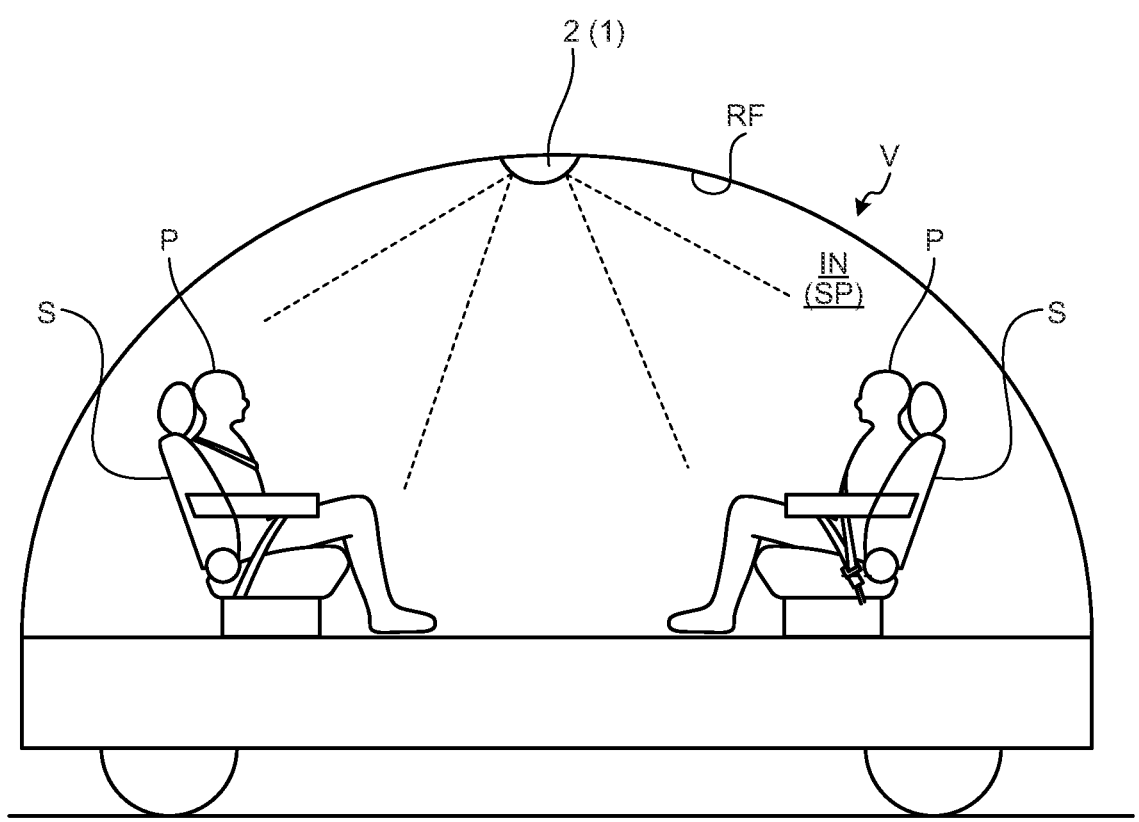
FIG. 2 is a schematic sectional view illustrating an example of mounting the fall prevention system according to the embodiment.

A fall prevention system 1 of the present embodiment illustrated in FIG. 1 and FIG. 2 is a system that monitors the state of a person P present in a space SP to be monitored and that prevents the person P from falling over.

The fall prevention system 1 of the present embodiment configures an in-vehicle system installed in a vehicle V that allows the person P to board and that can transport the person P. In the vehicle V, a vehicle interior space IN is the space SP to be monitored by the fall prevention system 1. In other words, the space SP to be monitored in the present embodiment is the vehicle interior space IN in the vehicle V that can transport the person P.

The fall prevention system 1 of the present embodiment is a structural module that monitors the space SP to be monitored described above and that performs a fall prevention process according to the state of the person P. In this example, the fall prevention system 1 configures a cooperation system sys with an external device 201 provided outside the vehicle V. The cooperation system sys includes the fall prevention system 1 installed in the vehicle V, and the external device 201 that is provided outside the vehicle V and that can transmit and receive information to and from the fall prevention system 1.

The fall prevention system 1 of the present embodiment improves the accuracy of state determination, by determining the state of the person P present in the space SP to be monitored, on the basis of a skeleton model MDL (see FIG. 3) representing the person P, and prevents a fall in a more appropriate manner on the basis of the above. The fall prevention system 1 is implemented by installing the components illustrated in FIG. 1 in the vehicle V. Hereinafter, a configuration of the fall prevention system 1 will be described in detail with reference to the accompanying drawings.

In the fall prevention system 1 illustrated in FIG. 1, unless otherwise specified, the components for transmitting and receiving electric power, control signals, various types of information, and the like may be wired or wirelessly connected. For example, the wired connection is connected via wiring materials such as wires and optical fibers. For example, the wireless connection is connected by wireless communication, non-contact power supply, and the like.

The vehicle V to which the fall prevention system 1 is applied may be any vehicle that uses a motor or an engine as a driving source such as an Electric Vehicle (EV), a Hybrid Electric Vehicle (HEV), a Plug-in Hybrid Electric Vehicle (PHEV), a gasoline vehicle, and a diesel vehicle. The vehicle V may be driven manually by a driver, semi-automatically, fully automatically, or the like. The vehicle V may also be any one of what is called a private vehicle owned by an individual, a rental car, a shared car, a bus, a taxi, and a ride-sharing car. For example, in the following description, the vehicle V will be described as a fully automated driving vehicle that is managed by a specific company or the like, that is used by a large number of unspecified users, and that moves automatically to boarding and alighting locations booked by the user, such as a bus, a taxi, and a ride-sharing car. If the vehicle V is driven fully automatically, a driver may not be present in the vehicle V. Moreover, for example, the external device 201 is provided in facilities such as a company that manages the vehicle V.

Specifically, as illustrated in FIG. 1 and FIG. 2, the fall prevention system 1 includes an image capturing unit 2, an information output unit 3, a microphone 4, a notification unit 5, an external communication unit 6, an internal communication unit 7, and a control device 8. The information output unit 3, the notification unit 5, the external communication unit 6, the internal communication unit 7, and the like configure an operation unit in the fall prevention system 1 that performs various fall prevention operations to prevent the person P from falling over. For example, the fall prevention system 1 may also configure an Over-Head Module (OHM), a Roof Module (RM), and the like in which various functions are integrated, by assembling these components in a housing and the like to form a unit, and by providing the unitized components on the roof (RF) of the vehicle V. For example, each of the units of the fall prevention system 1 may also be provided separately in the vehicle V.

The image capturing unit 2 captures an image of the space SP to be monitored. For example, the image capturing unit 2 may be a monocular camera that can capture a two-dimensional image, or a stereo camera that can capture a three-dimensional image. The image capturing unit 2 may also be what is called a Time of Flight (TOF) camera or the like. The image capturing unit 2 is provided on a location that can capture an image of all passengers in the vehicle interior space IN that configures the space SP to be monitored. For example, the image capturing unit 2 is disposed on the upper part of the vehicle interior space IN in the vehicle V, in this example, on the roof RF, and the angle of view of the image capturing unit 2 is set such that the entire area of the vehicle interior space IN is included in the imaging range. If one image capturing unit 2 cannot cover the entire area of the vehicle interior space IN, a plurality of the image capturing units 2 may be provided to cover the entire area of the vehicle interior space IN. Typically, the image captured by the image capturing unit 2 is used for determining the state of the person P by the control device 8.

The information output unit 3 can output various types of information toward the vehicle interior space IN (space SP to be monitored). The information output unit 3 of the present embodiment configures a guiding unit that performs a guiding operation, which will be described below, and provides various types of guidance (announcements) by outputting various types of information. For example, the information output unit 3 includes a display 3a and a speaker 3b.

The display 3a displays (outputs) image information (visual information) toward the vehicle interior space IN.

For example, the display 3a is formed by a thin liquid crystal display, a plasma display, an organic electro-luminescent (EL) display, or the like. The display 3a displays image information on a location that can be viewed from the person P in the vehicle interior space IN.

The speaker 3b outputs sound information (auditory information) toward the vehicle interior space IN. For example, the speaker 3b may be a speaker with high directivity that can only allow the specific person P, to whom the user wishes to provide information, to hear the sound information in the vehicle interior space IN.

The information output unit 3 may also include an indication lamp, an indicator, and the like, in addition to the display 3a and the speaker 3b.

The microphone 4 is a sound collection device that converts the sound produced in the vehicle interior space IN into electrical signals. For example, the microphone 4 can be used for verbal communication with a person outside the vehicle interior space IN (for example, an operator, which will be described below, and the like).

The notification unit 5 performs a notification operation, which will be described below, and can notify various types of information to the person P inside and outside the vehicle interior space IN (space SP to be monitored). Typically, the notification unit 5 performs a variety of notifications by outputting various types of notification to a person different from the person P to be monitored by the fall prevention system 1, such as a person supporting the service provided in the vehicle V, and a driver, if the vehicle V is a manually driven vehicle, by outputting various types of information. For example, similar to the information output unit 3 described above, the notification unit 5 includes a speaker, a display, an indication lamp, an indicator, and the like. The information output unit 3 described above may also be used as the notification unit 5.

The external communication unit 6 is a wireless communication functional part installed in the vehicle V, and that can communicate with the external device 201 outside the vehicle interior space IN (space SP to be monitored). The external communication unit 6 is a communication module (Data Communication Module) that wirelessly connects the vehicle V with a network N outside the vehicle V.

In this example, the network N communicatively connects the fall prevention system 1 to the external device 201 of the vehicle V. Whether wired or wireless, the network N may be any communication network. The external communication unit 6 transmits and receives information between the device connected to the network N and the fall prevention system 1.

For example, the external communication unit 6 can communicate with the device outside the vehicle V via the network N using various types of wireless communication, such as a wide band radio and a narrow band radio. For example, the wide band radio system includes radio (AM, FM), TV (UHF, 4K, 8K), TEL, global positioning system (GPS), Worldwide Interoperability for Microwave Access (WiMAX) (registered trademark), and the like. For example, the narrow band radio system includes electronic toll collection system (ETC)/dedicated short range communications (DSRC), vehicle information and communication system (VICS) (registered trademark), wireless LAN, millimeter-wave communication, and the like. The external communication unit 6 of the present embodiment transmits and receives information to and from the external device 201 connected to the network N, at least via the network N. In other words, the external communication unit 6 of the present embodiment can communicate at least with the external device 201 serving as a device outside the vehicle V.

The internal communication unit 7 is a communication relay functional part installed in the vehicle V, and can communicate with an in-vehicle device 101 installed in the vehicle V. The internal communication unit 7 can communicate with an Electronic Control Unit (ECU) 100 and the in-vehicle device 101 installed in the vehicle V, via an in-vehicle network or the like. In other words, the internal communication unit 7 can transmit and receive various types of information to and from the ECU 100 and the in-vehicle device 101 installed in the vehicle V.

In this example, the ECU 100 is an electronic control unit that controls the entire vehicle V including the in-vehicle device 101 and the like in an overall manner. The ECU 100 may be configured as a part of the fall prevention system 1. In other words, the fall prevention system 1 may include the ECU 100. The in-vehicle device 101 is a device installed in the vehicle V, and that implements various functions. The internal communication unit 7 transmits and receives information to and from a plurality of the in-vehicle devices 101 connected to the ECU 100 via the ECU 100. For example, the in-vehicle devices 101 in the present embodiment include a traveling system actuator as one of various devices for driving the vehicle V.

Typically, the traveling system actuator includes a traveling power train, a steering device, a braking device, and the like. The traveling power train is a driving device for driving the vehicle V. The steering device is a device for steering the vehicle V. The braking device is a device for braking the vehicle V. The in-vehicle device 101 may also include a lighting device, an air conditioning device, a display device, an acoustic device, and the like for the vehicle V.

The control device 8 controls the units of the fall prevention system 1 in an overall manner. The control device 8 monitors the state in the vehicle interior space IN, and executes various arithmetic processes for performing various processes according to the circumstances. The control device 8 includes an electronic circuit mainly composed of a known microcomputer including a central arithmetic processing apparatus such as a Central Processing Unit (CPU), a Micro Processing Unit (MPU), an Application Specific Integrated Circuit (ASIC), and a Field Programmable Gate Array (FPGA); a Read Only Memory (ROM); a Random Access Memory (RAM); and an interface. The control device 8 is electrically connected to the image capturing unit 2, the information output unit 3, the microphone 4, the notification unit 5, the external communication unit 6, the internal communication unit 7, and the like. The control device 8 can transmit and receive various electric signals such as various detection signals and driving signals to drive the units, to and from the units.

Specifically, the control device 8 includes an interface unit 8A, a storage unit 8B, and a processing unit 8C in a functionally conceptual manner. The interface unit 8A, the storage unit 8B, and the processing unit 8C can transmit and receive various types of information to and from various types of electrically connected devices.

The interface unit 8A is an interface for transmitting and receiving various types of information to and from the units in the fall prevention system 1 such as the image capturing unit 2, the information output unit 3, the microphone 4, the notification unit 5, the external communication unit 6, and the internal communication unit 7. The interface unit 8A has a function of transmitting and receiving information to and from each unit by wired communication via wire and the like, a function of transmitting and receiving information to and from each unit by wireless communication via a wireless communication unit, and the like.

The storage unit 8B is a storage device that stores various types of information. For example, the storage unit 8B may be a relatively large capacity storage device such as a hard disk, a Solid State Drive (SSD), and an optical disk; or a data rewritable semiconductor memory such as RAM, flash memory, and a Non Volatile Static Random Access Memory (NVSRAM). The storage unit 8B stores conditions and information necessary for various processes in the control device 8, various computer programs and applications to be executed by the control device 8, control data, and the like. For example, the storage unit 8B stores a learned mathematical model and the like used for determining a state of the person P in the vehicle interior space IN (space SP to be monitored). For example, the storage unit 8B can also temporarily store image information of an image captured by the image capturing unit 2, output information output from the information output unit 3 and the notification unit 5, various types of information received by the external communication unit 6 and the internal communication unit 7, and the like. Such information is read out from the storage unit 8B by the processing unit 8C and the like as necessary.

The processing unit 8C is a portion that executes various computer programs stored in the storage unit 8B on the basis of various input signals and the like, and that executes various processes for outputting output signals to the units and implementing various functions, by operating the computer programs.

The processing unit 8C of the present embodiment can determine the state of the person P present in the vehicle interior space IN (space SP to be monitored) on the basis of the skeleton model MDL (see FIG. 3) representing the person P, and execute the fall prevention process according to the determination result.

The processing unit 8C of the present embodiment includes an information processing unit 8a, a skeleton model generating unit 8b, a determination unit 8c, and an operation processing unit 8d in a functionally conceptual manner, to execute the various processes described above.

The information processing unit 8a is a portion having a function that can execute processes on various types of information used in the fall prevention system 1. For example, the information processing unit 8a controls the image capturing unit 2, and executes a process of capturing an image of the vehicle interior space IN (space SP to be monitored) in the vehicle V. The information processing unit 8a then executes a process of storing the image information of the vehicle interior space IN captured by the image capturing unit 2 into the storage unit 8B.

The information processing unit 8a can also control the external communication unit 6 to execute a process of transmitting and receiving various types of information to and from the external device 201. The information processing unit 8a can execute a process of reading the information transmitted by the external communication unit 6 from the storage unit 8B, and a process of storing the information received by the external communication unit 6 into the storage unit 8B. For example, the information processing unit 8a can execute a process of transmitting the image information captured by the image capturing unit 2 and the sound information collected by the microphone 4, to the external device 201 via the external communication unit 6. Moreover, the information processing unit 8a can execute a process of receiving the output information output from the display 3a and the speaker 3b, from the external device 201 via the external communication unit 6.

These processes performed by the information processing unit 8a enable the fall prevention system 1 to exchange information (for example, voice information, image information, and the like) with the external device 201.

The information processing unit 8a can also control the internal communication unit 7 to execute a process of transmitting and receiving various types of information to and from the in-vehicle device 101. The information processing unit 8a executes a process of reading the information transmitted by the internal communication unit 7 from the storage unit 8B, and a process of storing the information received by the internal communication unit 7 into the storage unit 8B. For example, the information processing unit 8a also executes a process of transmitting and receiving various types of information to and from the in-vehicle device 101 via the ECU 100. For example, the information processing unit 8a executes a process of transmitting the information for operating the in-vehicle device 101 and the like by the operation processing unit 8d, which will be described below, to the in-vehicle device 101 via the internal communication unit 7.

The skeleton model generating unit 8b is a portion having a function that can execute a process of generating the skeleton model MDL (see FIG. 3) representing the person P in an image of the vehicle interior space IN (space SP to be monitored) captured by the image capturing unit 2. The skeleton model MDL is a human body model that represents the human skeleton including the head, eyes, nose, mouth, shoulders, hips, feet, knees, elbows, hands, joints, and the like of the person P in a three-dimensional manner.

Figure 3:
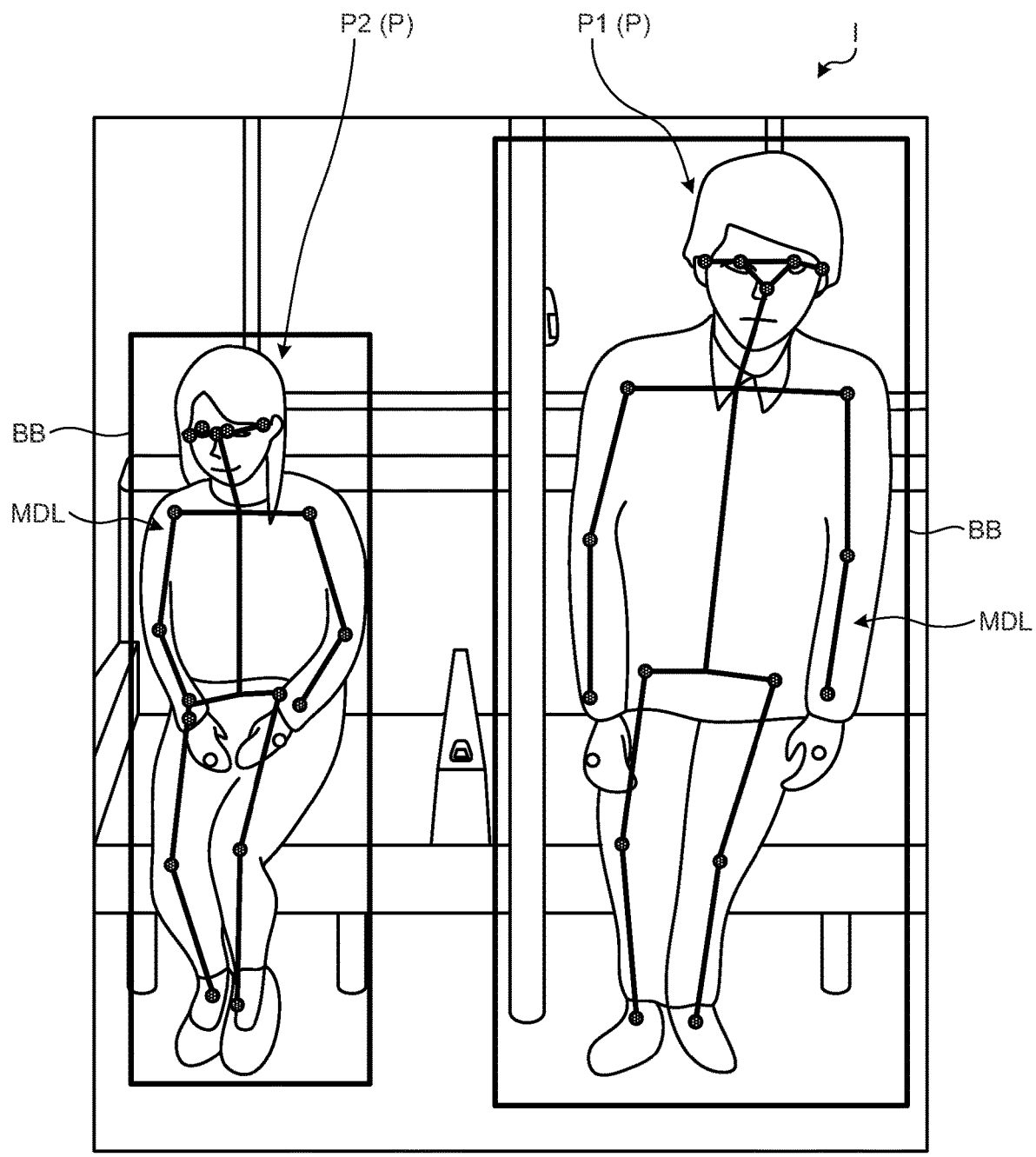
FIG. 3 is a schematic view for explaining an example of state determination based on a skeleton model in the fall prevention system according to the embodiment.

FIG. 3 is an example of an image I of the vehicle interior space IN captured by the image capturing unit 2. For example, the skeleton model generating unit 8b estimates and generates the skeleton model MDL representing the person P in the image I, from the image I captured by the image capturing unit 2 using various known methods such as a background subtraction method, a mean shift method, pattern matching, various machine learning methods, and the like.

For example, after detecting the person P, the skeleton model generating unit 8b can generate the skeleton model MDL representing the person P in the image I, by top-down skeleton estimation that estimates the skeleton of the person P. In this case, the skeleton model generating unit 8b recognizes the person P in the image I using various known object recognition techniques, and executes a process of enclosing the outside of an area where the person P recognized in the image I is present, with a bounding box BB. In this example, the bounding box BB is a rectangular frame large enough to enclose the person P recognized in the image I. The skeleton model generating unit 8b then detects three-dimensional position coordinates of each of the skeleton parts (human body parts) of the human body such as the head, eyes, nose, mouth, shoulders, hips, feet, knees, elbows, hands, joints, and the like of the person P in the bounding box BB, and generates the skeleton model MDL of the person P by combining the coordinates. In the skeleton model MDL illustrated in FIG. 3, skeleton parts of the human body such as the head, eyes, nose, mouth, shoulders, hips, feet, knees, elbows, hands, joints, and the like of the person P are symbolically represented by "points", and the skeleton model MDL is generated by connecting the points with "lines". If the person P in the image I is multiple in numbers, the skeleton model generating unit 8b generates multiple skeleton models MDL according to the number of the person P.

For example, the skeleton model generating unit 8b may also generate the skeleton model representing the person P in the image I, by bottom-up skeleton estimation that estimates the skeleton of the person P, after detecting all the skeleton parts of the human body in the image I without using the bounding box BB and the like. In this case, the skeleton model generating unit 8b first detects all the three-dimensional position coordinates of the skeleton parts such as the head, eyes, nose, mouth, shoulders, hips, feet, knees, elbows, hands, joints, and the like of the human body in the image I, using various known object recognition techniques. The skeleton model generating unit 8b then generates the skeleton model MDL of each person P, by matching and joining the detected skeleton parts for each person P.

The determination unit 8c is a portion having a function that can execute a process of determining the state of the person P corresponding to the skeleton model MDL generated by the skeleton model generating unit 8b, on the basis of the skeleton model MDL. The determination unit 8c of the present embodiment determines the state of the person P corresponding to the skeleton model MDL generated by the skeleton model generating unit 8b, by distinguishing between the person P standing up and the person P sitting down. A person P1 illustrated in FIG. 3 is standing up, and a person P2 illustrated in FIG. 3 is sitting down on a seat S in the vehicle interior space IN. On the basis of the skeleton model MDL generated by the skeleton model generating unit 8b, the determination unit 8c of the present embodiment determines the state of the person P corresponding to the skeleton model MDL, by also distinguishing the person P fallen over, in addition to the person P standing up and the person P sitting down. The determination unit 8c determines the state of the person P, when the person P is in the image I of the vehicle interior space IN (space SP to be monitored) captured by the image capturing unit 2.

For example, the fall prevention system 1 learns in advance the state of the person P standing up, the state of the person P sitting down, and the state of the person P fallen over by various machine learning methods, using the relative positional relation of the skeleton parts in the skeleton model MDL, the relative distance, the size of the bounding box BB, and the like as parameters. For example, the fall prevention system 1 uses the "relative positional relation of the skeleton parts in the skeleton model MDL, the relative distance, the size of the bounding box BB", and the like collected in advance as explanatory variables, and performs machine learning using "whether the person P is standing up, is sitting down, or has fallen over" and the like as objective variables. For example, as the machine learning, various types of algorithms applicable to the present embodiment such as logistic regression, support vector machine, neural network, and random forest may be used. The fall prevention system 1 stores in advance the learned mathematical model for state determination and the like obtained by the machine learning into the storage unit 8B.

Then, the determination unit 8c determines the state of the person corresponding to the skeleton model MDL, by classification and regression based on the learned mathematical model for state determination or the like stored in the storage unit 8B as described above. More specifically, the determination unit 8c supplies the relative positional relation of the skeleton parts obtained from the skeleton model MDL of the person P in the actually captured image I, the relative distance, and the size of the bounding box BB into the mathematical model for state determination. Consequently, the determination unit 8c determines the state of the person P corresponding to the skeleton model MDL, by distinguishing between the person P standing up, the person P sitting down, and the person P fallen over.

The operation processing unit 8d is a portion having a function that can execute a process of controlling the operation of each of the units of the fall prevention system 1. On the basis of the determination result by the determination unit 8c, the operation processing unit 8d of the present embodiment can execute the fall prevention process that is a process according to the determination result and that prevents the person P from falling over. On the basis of the determination result by the determination unit, the operation processing unit 8d controls the information output unit 3, the notification unit 5, the external communication unit 6, the internal communication unit 7, and the like that configure the operation unit, and executes the fall prevention process according to the determination result.

For example, when the determination unit 8c determines that the person P corresponding to the skeleton model MDL is standing up after the person P boards the vehicle V, the operation processing unit 8d executes a guidance process as the fall prevention process. The guidance process is a process of controlling the information output unit 3 to guide the person P to sit down. For example, by executing the guidance process as the fall prevention process, the operation processing unit 8d controls the display 3a that configures the information output unit 3, to display guidance on the display 3a urging the person P to sit down, and warning the person P to be careful and not to fall over. Moreover, for example, by executing the guidance process as the fall prevention process, the operation processing unit 8d may also control the speaker 3b that configures the information output unit 3, to output voice guidance from the speaker 3b urging the person P to sit down, and warning the person P to be careful and not to fall over.

In this case, when the determination unit 8c determines that the person P corresponding to the skeleton model MDL is standing for a predetermined continuous period of time after the guidance process is executed, the operation processing unit 8d may further execute a first reporting process as the fall prevention process. The first reporting process is a process of controlling the external communication unit 6 to report the external device 201 that the person P is standing up.

The external device 201 will now be briefly described. For example, as described above, the external device 201 is provided in facilities such as a company that manages the vehicle V. The external device 201 configures cloud service equipment implemented in the network N outside the vehicle V, and configures the center of what is called a cloud service. The external device 201 can transmit and receive information to and from the fall prevention system 1 (vehicle V) via the network N. The external device 201 can also be configured by installing an application that implements various processes on a computer system such as a known personal computer (PC) or workstation. The fall prevention system 1 can receive various cloud services from the external device 201 by mutually communicating and cooperating with the external device 201 via the external communication unit 6.

For example, as illustrated in FIG. 1, the external device 201 includes a communication unit 202, an information output unit 203, a microphone 204, and a control device 205. Similar to the external communication unit 6, the communication unit 202 is a communication module that can communicate with the network N. In this example, the communication unit 202 can communicate with the fall prevention system 1 via the network N in a wired/wireless manner. Similar to the information output unit 3, the information output unit 203 can output various types of information, and includes a display 203*a*, a speaker 203*b*, and the like. Similar to the microphone 4, the microphone 204 is a sound collection device that converts sound into electrical signals, and is used for verbal communication with the person P in the vehicle V and the like. The control device 205 controls the units of the external device 201 in an overall manner, and similar to the control device 8, includes an interface unit 205A, a storage unit 205B, and a processing unit 205C in a functionally conceptual manner. The interface unit 205A is an interface for transmitting and receiving various types of information to and from the units of the external device 201 such as the communication unit 202, the information output unit 203, and the microphone 204. The storage unit 205B is a storage device that stores various types of information. The processing unit 205C is a portion that executes various computer programs stored in the storage unit 205B on the basis of various input signals and the like, and that executes various processes for outputting output signals to the units and implementing various functions, by operating the computer programs.

For example, by executing the first reporting process as the fall prevention process, the operation processing unit 8*d* reports an operator of a company or the like that the person P who boarded the vehicle V is still standing up, via the external device 201 configured as described above. Moreover, after making the report, the operation processing unit 8*d* may perform the process by the information processing unit 8*a* or communicate with the external device 201 to which the report is sent via the external communication unit 6. In this case, by exchanging various types of information (for example, voice information, image information, and the like) between the external device 201 and the vehicle V via the information output units 3 and 203, the microphones 4 and 204, and the like, the operation processing unit 8*d* enables the person P on the vehicle V side to directly communicate with the operator on the external device 201 side and the like. Consequently, for example, the operation processing unit 8*d* can urge the person P to sit down, directly from the operator on the external device 201 side and the like.

Moreover, for example, when the determination unit 8*c* determines that the person P corresponding to the skeleton model MDL is standing up, the operation processing unit 8*d* may execute a first notification process as the fall prevention process. The first notification process is a process of controlling the notification unit 5 to notify another person different from the person P that the person P is standing up. For example, by executing the first notification process as the fall prevention process, the operation processing unit 8*d* controls the speaker, the display, the indication lamp, the indicator, and the like that configure the notification unit 5, and notifies a person different from the person P such as a person supporting the service provided in vehicle V, and a driver, if the vehicle V is a manually driven vehicle, that the person P is standing up.

Furthermore, for example, when the determination unit 8*c* determines that the person P corresponding to the skeleton model MDL is standing up, the operation processing unit 8*d* may execute a start prohibition process as the fall prevention process. The start prohibition process is a process of controlling the in-vehicle device 101 via the internal communication unit 7 to prohibit the vehicle V from starting. For example, by executing the start prohibition process as the fall prevention process, the operation processing unit 8*d* controls the traveling system actuator and the like that configures the in-vehicle device 101 to prevent the vehicle V from starting.

Moreover, for example, when the determination unit 8*c* determines that the person P corresponding to the skeleton model MDL has fallen over, the operation processing unit 8*d* may execute a second notification process or a second reporting process.

The second notification process is a process of controlling the notification unit 5 to notify another person different from the person P that the person P has fallen over. For example, by executing the second notification process, the operation processing unit 8*d* controls the speaker, the display, the indication lamp, the indicator, and the like that configure the notification unit 5, to notify a person different from the person P such as a person supporting the service provided in the vehicle V, and a driver, if the vehicle V is a manually driven vehicle, that the person P has fallen over.

On the other hand, the second reporting process is a process of controlling the external communication unit 6 to report the external device 201 that the person P has fallen over. For example, by executing the second reporting process, the operation processing unit 8*d* reports an operator of a company or the like that the person P who boarded the vehicle V has fallen over via the external device 201 configured as above. As in the case of the first reporting process, after making the report, the operation processing unit 8*d* may also perform the process by the information processing unit 8*a*, or communicate with the external device 201 to which the report is sent via the external communication unit 6. Consequently, for example, the operation processing unit 8*d* can check the state of the person P fallen over, directly from the operator on the external device 201 side or the like.

Next, examples of controls in the fall prevention system 1 will be described with reference to the flowcharts in FIG. 4 and FIG. 5. The controls in FIG. 4 and FIG. 5 may be executed in parallel, or may be executed by incorporating one into the other.

Figure 4:
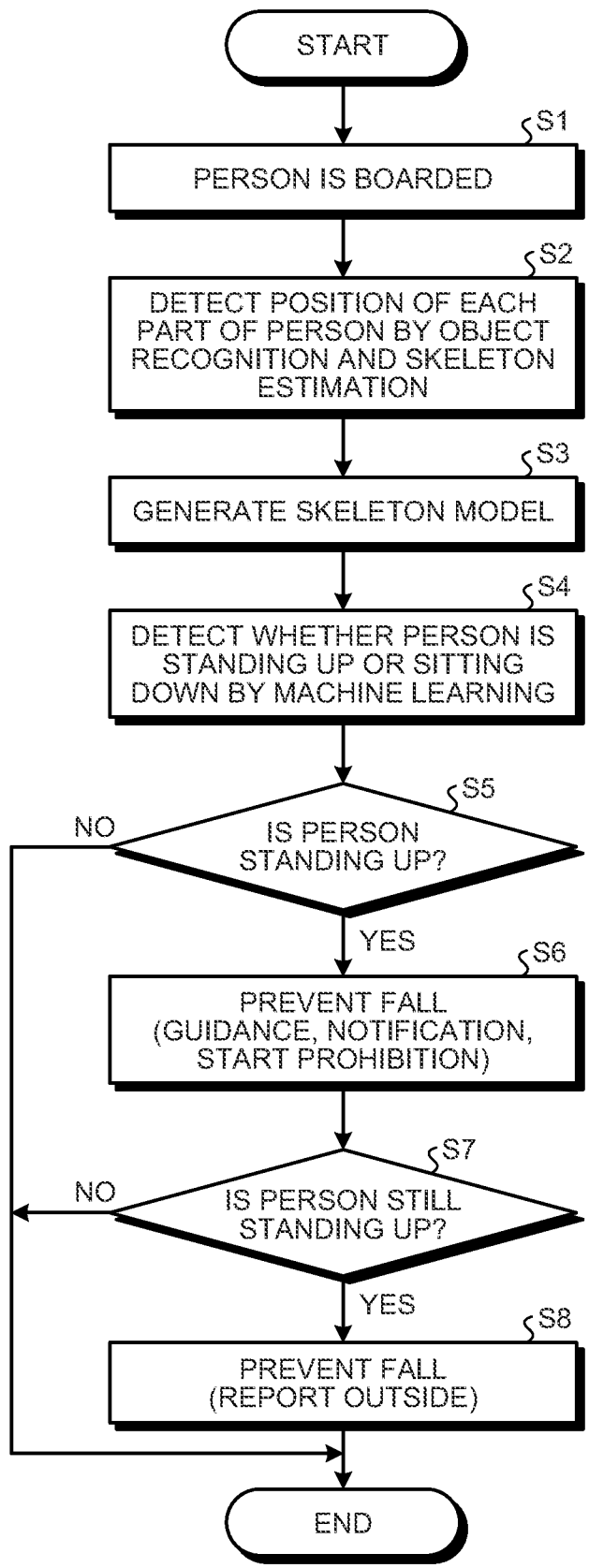
FIG. 4 is a flowchart illustrating examples of controls in the fall prevention system according to the embodiment.

First, in the control of FIG. 4, when the person P boards the vehicle interior space IN (space SP to be monitored) in the vehicle V, the information processing unit 8*a* of the control device 8 controls the image capturing unit 2 to capture the image I of the vehicle interior space IN, and stores the captured image information into the storage unit 8B (step S1).

Next, the skeleton model generating unit 8*b* of the control device 8 detects the position of each skeleton part of the person P by object recognition and skeleton estimation, on the basis of the image I of the vehicle interior space IN stored in the storage unit 8B (step S2), and generates the skeleton model MDL of the person P (step S3).

Next, on the basis of the skeleton model MDL generated in the process at step S3, the determination unit 8*c* of the control device 8 detects whether the person P corresponding to the skeleton model MDL is standing up or sitting down, using the mathematical model for state determination learned by machine learning or the like (step S4).

Then, the determination unit 8*c* determines whether the person P corresponding to the skeleton model MDL is standing up (step S5). When the determination unit 8*c* determines that the person P is not standing up, that is, the person P is sitting down (No at step S5), this control is terminated.

When the determination unit 8*c* determines that the person P corresponding to the skeleton model MDL is standing up (Yes at step S5), the operation processing unit 8*d* of the control device 8 executes the fall prevention process (step S6). For example, the operation processing unit 8*d* executes the guidance process, the first notification process, the start prohibition process, and the like described above, as the fall prevention process.

Then, after the fall prevention process is executed at step S6, the determination unit 8*c* determines whether the person P corresponding to the skeleton model MDL is still standing up, after a predetermined period of time (for example, about few minutes) has passed (step S7). When the determination unit 8*c* determines that the person P is not standing up, that is, the person P is sitting down (No at step S7), this control is terminated.

When the determination unit 8*c* determines that the person P corresponding to the skeleton model MDL is still standing up (Yes at step S7), the operation processing unit 8*d* executes the first reporting process described above as the fall prevention process (step 38), and terminates this control.

Figure 5:
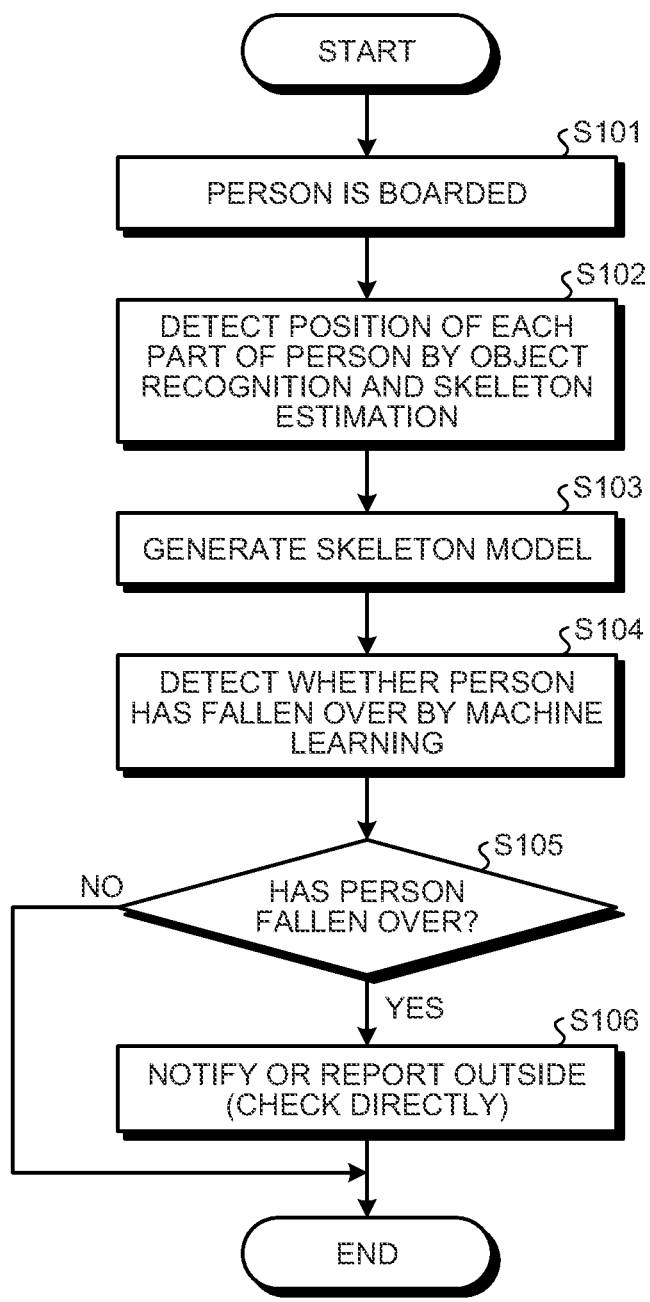
FIG. 5 is a flowchart illustrating examples of controls in the fall prevention system according to the embodiment.

First, in the control of FIG. 5, when the person P boards the vehicle interior space IN (space SP to be monitored) of the vehicle V, the information processing unit 8*a* controls the image capturing unit 2 to capture the image I of the vehicle interior space IN, and stores the captured image information into the storage unit 8B (step S101).

Next, on the basis of the image I of the vehicle interior space IN stored in the storage unit 8B, the skeleton model generating unit 8*b* detects the position of each skeleton part of the person P by object recognition and skeleton estimation (step S102), and generates the skeleton model MDL of the person P (step S103).

Next, on the basis of the skeleton model MDL generated in the process at step 3103, the determination unit 8*c* of the control device 8 detects whether the person P corresponding to the skeleton model MDL has fallen over, using the mathematical model for state determination learned by machine learning or the like (step 3104).

Then, the determination unit 8*c* determines whether the person P corresponding to the skeleton model MDL has fallen over (step S105). When the determination unit 8*c* determines that the person P has not fallen over, that is, the person P is either sitting down or standing up (No at step S105), this control is terminated.

When the determination unit 8*c* determines that the person P corresponding to the skeleton model MDL has fallen over (Yes at step S105), the operation processing unit 8*d* executes the second notification process, the second reporting process, or the like described above (step 3106), and terminates this control.

The fall prevention system 1 described above captures the image I of the space SP to be monitored by the image capturing unit 2, and generates the skeleton model MDL representing the person P in the image I, by the skeleton model generating unit 8*b*. Then, on the basis of the skeleton model MDL generated by the skeleton model generating unit 8*b*, the determination unit 8*c* determines the state of the person P corresponding to the skeleton model MDL, by distinguishing between the person P standing up and the person P sitting down. Then, on the basis of the determination result by the determination unit 8*c*, the operation processing unit 8*d* can execute the fall prevention process according to the determination result.

In this case, as described above, on the basis of the skeleton model MDL, the fall prevention system 1 can determine the state of the person P more in detail and accurately, by distinguishing between the person P standing up and the person P sitting down. Moreover, because the determination unit 8*c* determines the posture and the state of the person P from the skeleton model MDL of the person P in addition to the image including the person P, for example, even if the person P is moving in various ways, it is possible to determine the state of the person P in a more appropriate manner. As a result, the fall prevention system 1 is capable of preventing a fall in an appropriate manner on the basis of more accurate state determination.

Furthermore, when the determination unit 8*c* determines that the person P corresponding to the skeleton model MDL is standing up, the fall prevention system 1 described above can execute the guidance process by the operation processing unit 8*d* as the fall prevention process. In this case, because the fall prevention system 1 can guide the person P standing up to sit down, it is possible to prevent the person P from falling over.

Still furthermore, when the determination unit 8*c* determines that the person P corresponding to the skeleton model MDL is standing up, the fall prevention system 1 described above can execute the first notification process by the operation processing unit 8*d* as the fall prevention process. In this case, for example, the fall prevention system 1 can notify a person different from the person P standing up, such as a person supporting the service provided in the vehicle V, and a driver, if the vehicle V is a manually driven vehicle, that the person P standing up is present. As a result, the fall prevention system 1 can prevent the person P from falling over, through the supporting person, the driver, or the like.

Still furthermore, when the determination unit 8*c* determines that the person P corresponding to the skeleton model MDL is standing for a predetermined continuous period of time after the guidance process is executed, the fall prevention system 1 described above can also execute the first reporting process by the operation processing unit 8*d* as the fall prevention process. In this case, the fall prevention system 1 can report the operator of the company or the like that the person P standing up is present, via the external device 201. Consequently, for example, the fall prevention system 1 can urge the person P to sit down directly from the operator on the external device 201 side or the like, and can prevent the person P from falling over.

Still furthermore, when the determination unit 8*c* determines that the person P corresponding to the skeleton model MDL is standing up, the fall prevention system 1 described above can execute the start prohibition process by the operation processing unit 8*d* as the fall prevention process. In this case, if the person P standing up is present in the vehicle interior space IN, which is the space SP to be monitored, the fall prevention system 1 can prohibit the vehicle V from starting, and can prevent the person P from falling over.

Still furthermore, when the determination unit 8*c* determines that the person P corresponding to the skeleton model MDL has fallen over, the fall prevention system 1 described above can also execute the second notification process or the second reporting process by the operation processing unit 8*d*. In this case, because the fall prevention system 1 can quickly inform the fact that the person P has fallen over, to the person supporting the service provided in the vehicle V, the driver, if the vehicle V is a manually driven vehicle, the operator on the external device 201 side, and the like, it is possible to take prompt and appropriate actions.

The fall prevention system according to the embodiment of the present invention described above is not limited to the embodiment described above, and various changes may be made within the scope of the claims.

In the above description, the determination unit 8c determines the state of the person P represented by the skeleton model MDL, by distinguishing between the person P standing up, the person P sitting down, and the person P fallen over. However, the embodiment is not limited thereto. The determination unit 8c may determine the state of the person P represented by the skeleton model MDL, by distinguishing at least between the person P standing up and the person P sitting down.

In the above description, the fall prevention system 1 includes the information output unit 3, the microphone 4, the notification unit 5, the external communication unit 6, and the internal communication unit 7. However, it is not limited thereto, and the fall prevention system 1 may not include any of the information output unit 3, the microphone 4, the notification unit 5, the external communication unit 6, and the internal communication unit 7.

In the above description, the fall prevention process is the guidance process, the notification process, the first notification process, the start prohibition process, and the like. However, it is not limited thereto, and the fall prevention process may be any process as long as it can prevent a person from falling over.

In the above description, for example, the vehicle V is a fully automated driving vehicle managed by a specific company or the like such as a bus, a taxi, or a ride-sharing car. However, the embodiment is not limited thereto. For example, the vehicle V may be a vehicle that can be manually driven such that the behavior of the vehicle V is controlled according to the driving operations by the driver of the vehicle V.

In the above description, the fall prevention system 1 is installed in the vehicle V, and the space SP to be monitored is the vehicle interior space IN. However, the embodiment is not limited thereto. For example, the fall prevention system 1 may be applied to facilities other than the vehicle V such as a nursing home, and the space SP to be monitored may be a corridor space, a living room space, or the like of the facilities instead of the vehicle interior space IN.

The units of the control device 8 described above may be configured separately, and each of the units may be connected such that various electrical signals may be transmitted and received between the units, or part of the functions may be implemented by another control device. Moreover, the computer programs, applications, various types of data, and the like described above may be appropriately updated, or stored in a server connected to the fall prevention system 1 via any network. For example, all or a part of the computer programs, applications, various data, and the like described above may be downloaded as necessary. Furthermore, for example, all or a part of processing functions provided by the control device 8 may be implemented by a CPU, a computer program interpreted and executed by the CPU, and the like, or may be implemented as hardware using wired logic and the like.

The fall prevention system according to the present embodiment may be configured by appropriately combining the components of the embodiments and variations described above.

The fall prevention system according to the present embodiment captures an image of the space to be monitored by the image capturing unit, and generates a skeleton model representing a person in the image by the skeleton model generating unit. Then, on the basis of the skeleton model generated by the skeleton model generating unit, the determination unit determines the state of the person corresponding to the skeleton model, by distinguishing between the person standing up and the person sitting down. Then, on the basis of the determination result by the determination unit, the operation processing unit can execute the fall prevention process according to the determination result. In this case, as described above, the fall prevention system can determine the state of the person more in detail and accurately, by distinguishing between the person standing up and the person sitting down, on the basis of the skeleton model. As a result, the fall prevention system is capable of advantageously preventing a fall in an appropriate manner on the basis of more accurate state determination.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fall prevention system, comprising:
an image capturing unit that captures an image of a space to be monitored;
a skeleton model generating unit that generates a skeleton model representing a person in the image captured by the image capturing unit;
a determination unit that determines a state of the person corresponding to the skeleton model generated by the skeleton model generating unit, by distinguishing between the person standing up and the person sitting down, based on the skeleton model; and
an operation processing unit capable of executing a fall prevention process that is a process according to a determination result by the determination unit, and that prevents the person from falling over, based on the determination result, wherein
the skeleton model generating unit encloses the outside of an area where the person recognized in the image is present with a bounding box and generates the skeleton model of the person in the bounding box by combining skeleton parts of a human body of the person, and
the determination unit determines the state of the person corresponding to the skeleton model, by distinguishing between the person standing up and the person sitting down, on the basis of a relative positional relation of the skeleton parts in the skeleton model generated by a skeleton model generating unit, a relative distance, and a size of the bounding box.

2. The fall prevention system according to claim 1, further comprising:
a guiding unit that performs guidance, wherein
when the determination unit determines that the person corresponding to the skeleton model is standing up, the operation processing unit executes a guidance process of controlling the guiding unit to guide the person to sit down, as the fall prevention process.

3. The fall prevention system according to claim 2, further comprising:
a notification unit that sends notification, wherein
when the determination unit determines that the person corresponding to the skeleton model is standing up, the operation processing unit executes a first notification process of controlling the notification unit to notify another person different from the person that the person is standing up, as the fall prevention process.

4. The fall prevention system according to claim 3, further comprising:
an internal communication unit capable of communicating with an in-vehicle device installed in a vehicle in which a vehicle interior space is the space to be monitored, wherein
when the determination unit determines that the person corresponding to the skeleton model is standing up, the operation processing unit executes a start prohibition process of controlling the in-vehicle device via the internal communication unit to prohibit the vehicle from starting, as the fall prevention process.

5. The fall prevention system according to claim 4, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and
when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

6. The fall prevention system according to claim 3, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and
when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

7. The fall prevention system according to claim 2, further comprising:
an external communication unit capable of communicating with an external device outside the space to be monitored, wherein
when the determination unit determines that the person corresponding to the skeleton model is standing for a predetermined continuous period of time after the guidance process is executed, the operation processing unit executes a first reporting process of controlling the external communication unit to report the external device that the person is standing up, as the fall prevention process.

8. The fall prevention system according to claim 7, further comprising:
an internal communication unit capable of communicating with an in-vehicle device installed in a vehicle in which a vehicle interior space is the space to be monitored, wherein
when the determination unit determines that the person corresponding to the skeleton model is standing up, the operation processing unit executes a start prohibition process of controlling the in-vehicle device via the internal communication unit to prohibit the vehicle from starting, as the fall prevention process.

9. The fall prevention system according to claim 8, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and
when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

10. The fall prevention system according to claim 7, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and
when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

11. The fall prevention system according to claim 2, further comprising:
an internal communication unit capable of communicating with an in-vehicle device installed in a vehicle in which a vehicle interior space is the space to be monitored, wherein
when the determination unit determines that the person corresponding to the skeleton model is standing up, the operation processing unit executes a start prohibition process of controlling the in-vehicle device via the internal communication unit to prohibit the vehicle from starting, as the fall prevention process.

12. The fall prevention system according to claim 11, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and
when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

13. The fall prevention system according to claim 2, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and
when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

14. The fall prevention system according to claim 1, further comprising:
a notification unit that sends notification, wherein
when the determination unit determines that the person corresponding to the skeleton model is standing up, the operation processing unit executes a first notification process of controlling the notification unit to notify another person different from the person that the person is standing up, as the fall prevention process.

15. The fall prevention system according to claim 14, further comprising:
an internal communication unit capable of communicating with an in-vehicle device installed in a vehicle in which a vehicle interior space is the space to be monitored, wherein
when the determination unit determines that the person corresponding to the skeleton model is standing up, the operation processing unit executes a start prohibition process of controlling the in-vehicle device via the internal communication unit to prohibit the vehicle from starting, as the fall prevention process.

16. The fall prevention system according to claim 15, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and
when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

17. The fall prevention system according to claim 14, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and
when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

18. The fall prevention system according to claim 1, further comprising:
an internal communication unit capable of communicating with an in-vehicle device installed in a vehicle in which a vehicle interior space is the space to be monitored, wherein
when the determination unit determines that the person corresponding to the skeleton model is standing up, the operation processing unit executes a start prohibition process of controlling the in-vehicle device via the internal communication unit to prohibit the vehicle from starting, as the fall prevention process.

19. The fall prevention system according to claim 18, further comprising:
a notification unit that performs a notification operation, and
an external communication unit capable of communicating with an external device outside the space to be monitored, wherein
the determination unit determines the state of the person corresponding to the skeleton model, by also distinguishing the person fallen over, in addition to the person standing up and the person sitting down, based on the skeleton model generated by the model generating unit, and when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

20. The fall prevention system according to claim 1, further comprising:
   a notification unit that performs a notification operation, and
   an external communication unit capable of communicating with an external device outside the space to be monitored, wherein
   the determination unit determines the state of the person corresponding to the skeleton model, by also distinguishing the person fallen over, in addition to the person standing up and the person sitting down, based on the skeleton model generated by the model generating unit, and
   when the determination unit determines that the person corresponding to the skeleton model has fallen over, the operation processing unit executes a second notification process of controlling the notification unit to notify another person different from the person that the person has fallen over, or a second reporting process of controlling the external communication unit to report the external device that the person has fallen over.

* * * * *